United States Patent [19]

Miyazawa et al.

[11] Patent Number: 5,598,046

[45] Date of Patent: Jan. 28, 1997

[54] STEPPING MOTOR WITH DIFFERENT SIZED OR MISSING TEETH

[75] Inventors: Hiroshi Miyazawa; Hatsuo Kitahara; Hiroshi Namaizawa, all of Nagano, Japan

[73] Assignee: Kabushiki Kaisha Sankyo Seiki Seisakusho, Nagano, Japan

[21] Appl. No.: 382,642

[22] Filed: Feb. 2, 1995

[30] Foreign Application Priority Data

Feb. 2, 1994 [JP] Japan .................. 6-30877

[51] Int. Cl.$^6$ ............................ H02K 37/00
[52] U.S. Cl. ............... 310/49 R; 310/257; 310/258; 29/596; 310/43; 310/193
[58] Field of Search ................. 310/49 R, 257, 310/258, 43, 193; 29/596; 264/259

[56] References Cited

U.S. PATENT DOCUMENTS

| | | | |
|---|---|---|---|
| 4,355,248 | 10/1982 | Manson | 310/42 |
| 4,695,419 | 9/1987 | Inariba | 264/259 |
| 4,841,190 | 6/1989 | Matsushita et al. | 310/257 |
| 4,884,333 | 12/1989 | Cooper et al. | 29/596 |
| 4,942,325 | 7/1990 | Fukaya | 310/257 |
| 4,972,109 | 11/1990 | Kakizaki et al. | 310/49 A |
| 5,121,017 | 6/1992 | Yamamoto et al. | 310/49 R |
| 5,170,082 | 12/1992 | Nakagawa et al. | 310/45 |
| 5,283,487 | 2/1994 | Oki et al. | 310/49 R |
| 5,331,237 | 7/1994 | Ichimura | 310/44 |

*Primary Examiner*—Thomas M. Dougherty
*Assistant Examiner*—Elvin G. Enad
*Attorney, Agent, or Firm*—Sughrue, Mion, Zinn, Macpeak & Seas

[57] ABSTRACT

A width of polar teeth is made smaller at a region close to a gate portion 20 than a width of the polar teeth at the other region or a part of the polar teeth is eliminated at the region close to the gate portion 20 and the gap between the polar teeth is thereby increased so as to provide such a cavity as to facilitate the flow of a resin in an axial direction between the polar teeth, whereby the flow of the resin is facilitated.

4 Claims, 3 Drawing Sheets

STEPPING MOTOR WITH DIFFERENT SIZED OR MISSING TEETH

BACKGROUND OF THE INVENTION

1. Field of the invention

The invention relates to a permanent magnet type stepping motor, and more particularly to an improvement of the stator subassembly thereof.

2. Related art

FIG. 1 shows a construction of an ordinary permanent magnet type stepping motor 1. The stepping motor 1 includes a cylindrical rotor 2 and an annular stator 3 that surrounds the outer circumference of the rotor 2. The rotor 2 is constructed of a permanent magnet that is magnetized alternately into S and N poles along the outer circumference, and is rotatably supported by a central rotor shaft 4 with respect to a not shown motor case.

Further, the stator 3 is assembled by two stator subassemblies 5, 6. These stator subassemblies 5, 6 are integrally molded with a resin portion 15 while arranged in the axial direction of the rotor shaft 4. The stator subassemblies 5, 6 are formed of two annular stator cores 7, 8 and stator cores 9, 10, respectively.

These stator cores 7, 8, 9, 10 have comblike polar teeth 11, 12, 13, 14 in a central part thereof so as to correspond to the outer circumferential surface of the rotor 2, and are combined so as to alternate the polar teeth 11, 12, 13, 14 in terms of position so that the phases are shifted in a direction of rotation.

The resin portion 15 integrates the two stator subassemblies 5, 6, i.e., four stator cores 7, 8, 9, 10, and forms bobbins 16, 17 by covering the outer side surface of these stator subassemblies with a resin, i.e., an insulator to provide therein a space for accommodating coils 18, 19. At the time of molding the resin portion 15, the resin is charged from one or two or more gate portions 20 formed on the side surface of the resin portion 15. Holes 21 are formed at an appropriate interval on flange portions of the stator cores 7, 8, 9, 10. As the resin is introduced into these holes, the combining of these portions made of different materials is reinforced. It may be noted that the polar teeth 11, 12, 13, 14, being located on the same surface as the inner circumferential surface of the resin portion 15, are exposed only from the inner circumferential surface and therefore confront the outer circumferential surface of the rotor (permanent magnet).

FIG. 2 shows how the stator subassemblies 5, 6 (stator cores 7, 8, 9, 10) are combined. As shown in FIG. 2, the stator cores 8, 9 in the middle which are disposed back to back are located out of phase with each other, so that the gap between the polar teeth 12, 13 thereof is small. As a result, when the resin is charged into a cavity between an inner mold 22 and an outer mold 23 and insert-molded, the resin does not flow smoothly at such small-gapped portion. This causes the polar teeth 11, 12, 13, 14, particularly, the polar teeth 11, 13 of the stator cores in the middle to be bent outward by the resin charging pressure, which in turn causes the resin to overhang the inner circumferential surface of the polar teeth 11, 12, 13, 14. As a result, not only the magnetic resistance is increased, but also the polar teeth 11, 12, 13, 14 are fallen outward to reduce the wall thickness of the bobbins 16, 17 at the region where the polar teeth are fallen, which imposes the problem of insulation. This shortcoming is noticeably addressed when the number of polar teeth is increased.

SUMMARY OF THE INVENTION

The invention has been made in consideration of the aforementioned circumstances. Accordingly, the object of the invention is to prevent the resin from overhanging the inner circumferential surface of the polar teeth and the thickness of the resin portion from being reduced by preventing deformation of the polar teeth at the time of insert molding.

To achieve the above object, the invention is provided by making a width of polar teeth close to a gate portion smaller than a width of other polar teeth or by eliminating a part of the polar teeth and thereby increasing a gap between the polar teeth at the region close to the gate portion so as to provide a space for facilitating flow of a resin in an axial direction between the polar teeth, whereby the flow of the resin is facilitated.

The invention allows the resin to enter into the inner side of the polar teeth at the time of insert molding to prevent the polar teeth from being deformed. Therefore, overhanging of the resin portion with respect to the polar teeth can be prevented, which provides satisfactory basic characteristics of the stepping motor, particularly the balancing of the two phases, and which therefore improves accuracy in stop position. Further, the resin charged from the gate portion is distributed uniformly within the molds. Therefore, even if a material of low fluidity such as a glass fiber reinforced resin is used, incidence of defective molding is reduced and productivity can thereby be improved. Still further, the elimination of the thin-walled resin portion or space not filled with the resin contributes to improving the withstand voltage and thereby prevents short circuits between the stator cores and the coils or the like, thus stabilizing electromagnetic characteristics of the stepping motor.

DETAILED DESCRIPTION OF THE PREFERRED EMBODIMENTS

Figure 1:
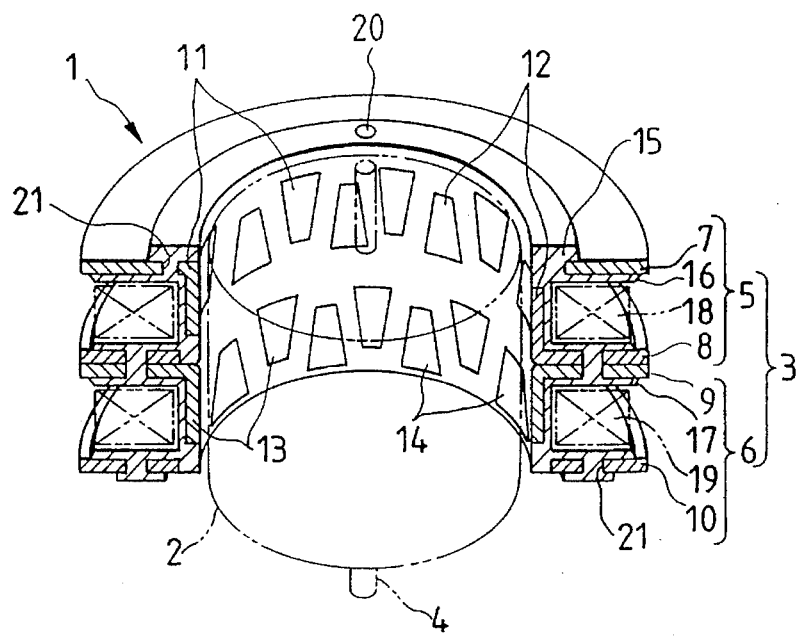
FIG. 1 is a partially cutaway perspective view of a conventional stepping motor.
Figure 2:
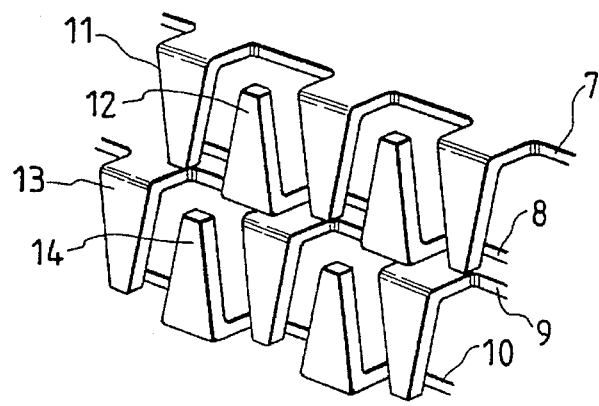
FIG. 2 is a perspective view showing a positional relationship among polar teeth.
Figure 3:
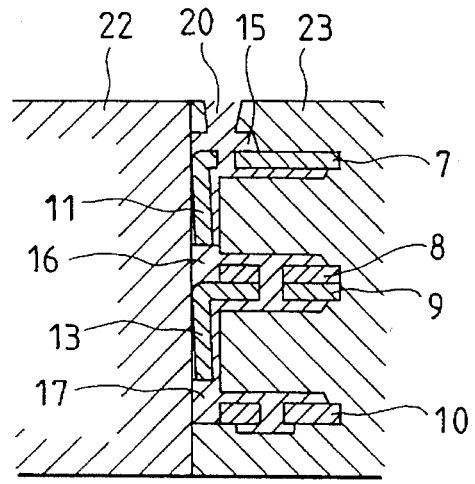
FIG. 3 is a sectional view of a main portion of a stepping motor at the time of molding.
Figure 4:
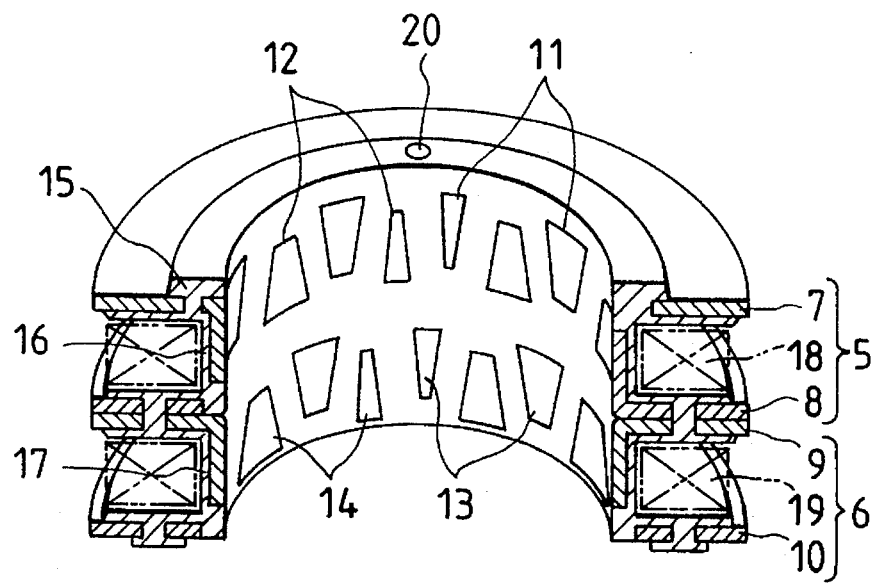
FIG. 4 is a cutaway perspective view showing a main portion of a stepping motor of the invention.

In the embodiment shown in FIG. 4, the widths of four polar teeth 11, 12, 13, 14 at a region close to a gate portion 20 are smaller than the widths of the polar teeth 11, 12, 13, 14 at the other region, and the gap between the polar teeth 11, 12 and between the polar teeth 13, 14 is increased. As a result of this construction, resin charged from the gate portion 20 at the time of insert molding flows from one side to the other through the large gap, thus allowing the resin to be distributed uniformly into the molding cavity formed between an inner mold 22 and an outer mold 23 and thereby in no way causing a force to bend the polar teeth 11, 12, 13, 14 outward. Therefore, there is no overhanging of the resin with respect to the polar teeth 11, 12, 13, 14 on the inner circumferential surface, nor is there partial reduction in the wall thickness of the resin portion 15.

Figure 5:
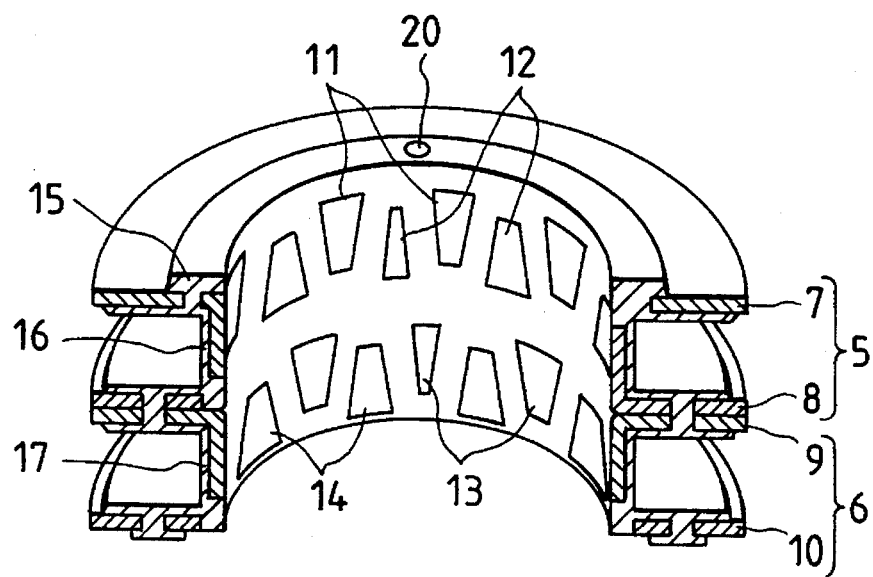
FIG. 5 is a cutaway perspective view showing a main portion of a stepping motor of the invention.

In the embodiment shown in FIG. 5, only the widths of the polar teeth 12, 13 of the inner-side stator cores 8, 9 are smaller. As a result of this construction, an adequate gap is provided between the stator cores 8, 9 in the middle, so that a cavity necessary for the flow of resin can be formed. Hence, the resin charged from the gate portion 20 passes through the stator cores 8, 9 in the middle, allowing the resin to be adequately distributed to the remote stator subassembly 6.

Figure 6:
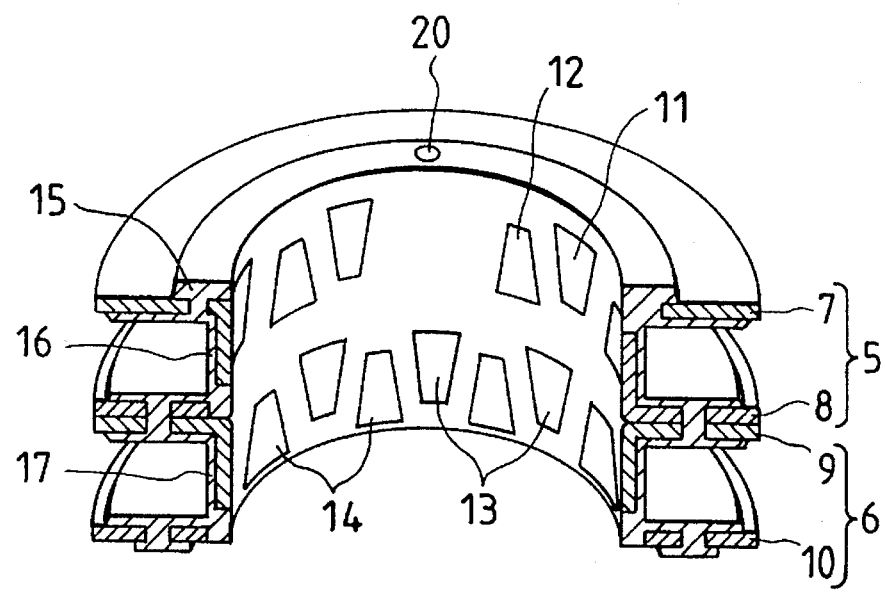
FIG. 6 is a cutaway perspective view showing a main portion of a stepping motor of the invention.
Figure 7:
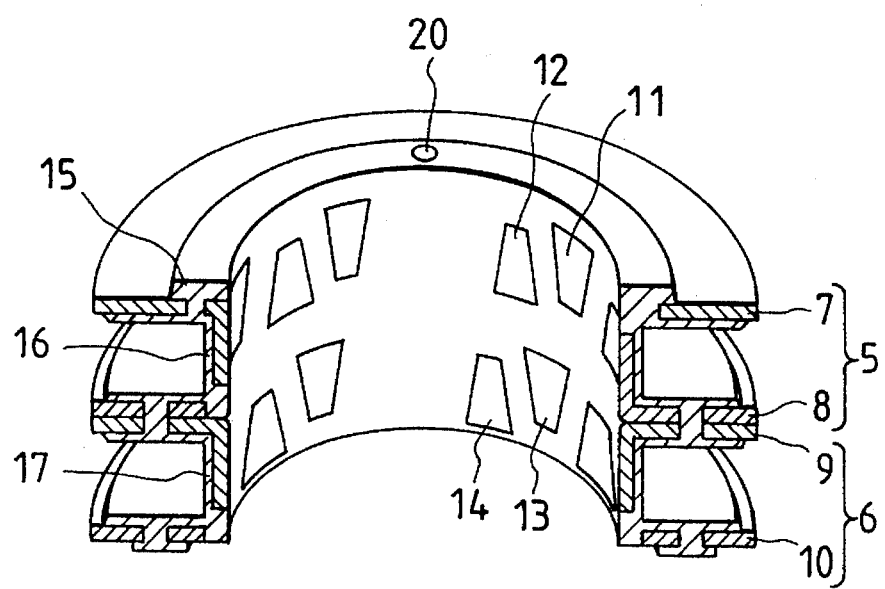
FIG. 7 is a cutaway perspective view showing a main portion of a stepping motor of the invention.

Moreover, in the embodiments shown in FIGS. 6 and 7 are the two polar teeth 11, 12 or the four polar teeth 11, 12, 13, 14 close to the gate portion 20 are eliminated so that the flow path of the resin is formed. As a result of this construction, advantages similar to those of the aforementioned embodiments can also be provided.

While the reduction in the widths of the polar teeth 11, 12, 13, 14 or the partial elimination of the polar teeth 11, 12, 13, 14 leads to a reduction in magnetic flux density and therefore to a reduction in magnetic flux utilizing efficiency locally at the region concerned, the construction of the invention is still advantageous in this regard when compared with the example in which the magnetic flux utilizing efficiency is reduced by the overhanging of the resin with respect to the polar teeth 11, 12, 13, 14. Further, the fact that there is no partial reduction in the wall thickness of the resin portion 15 contributes to ensuring sufficient withstand voltage between the stator cores 7, 8, 9, 10 and the coils 16, 17 and therefore to preventing short circuits and the like.

The invention provides the following advantages. The invention allows the resin to enter into the inner side of the polar teeth at the time of insert molding to prevent the polar teeth from being deformed. Therefore, overhanging of the resin portion with respect to the polar teeth can be prevented, which provides satisfactory basic characteristics of the stepping motor, particularly the balancing of the two phases, and which therefore improves accuracy in stop position. Further, the resin charged from the gate portion is distributed uniformly within the molds. Therefore, even if a material of low fluidity such as a glass fiber reinforced resin is used, incidence of defective molding is reduced and productivity can thereby be improved. Still further, the elimination of the thin-walled resin portion or space not filled with the resin contributes to improving the withstand voltage and thereby prevents short circuits between the stator cores and the coils or the like, thus stabilizing electromagnetic characteristics of the stepping motor.

What is claimed is:

1. A stepping motor comprising:

coil subassemblies arranged in an axial direction of a cylindrical rotor and integrated with a resin portion, each one of said coil subassemblies having upper and lower stator cores and a coil formed therebetween, each one of the stator cores having comblike polar teeth in a central portion thereof, the polar teeth being alternately arranged and confronting a magnet of the cylindrical rotor, wherein a gate portion for charging a resin is disposed on a side surface of the resin portion, the polar teeth close to the gate portion have a smaller width than the other polar teeth, and a gap between the polar teeth of smaller width is greater than a gap between the other polar teeth.

2. A stepping motor comprising:

coil subassemblies arranged in an axial direction of a cylindrical rotor and integrated with a resin portion, each one of said coil subassemblies having upper and lower stator cores and a coil formed therebetween, each one of the stator cores having comblike polar teeth in a central portion thereof, the polar teeth being alternately arranged and confronting a magnet of the cylindrical rotor, wherein a gate portion for charging a resin is disposed on a side surface of the resin portion, a lower stator core of one subassembly confronts an upper stator core of another subassembly, and only the polar teeth on said lower stator core and said upper stator core in a vicinity of said gate portion have a smaller width than the other polar teeth.

3. A stepping motor comprising:

coil subassemblies arranged in an axial direction of a cylindrical rotor and integrated with a resin portion, each one of said coil subassemblies having upper and lower stator cores and a coil formed therebetween, each one of the stator cores having comblike polar teeth in a central portion thereof, the polar teeth being alternately arranged and confronting a magnet of the cylindrical rotor, wherein a gate portion for charging a resin is disposed on a side surface of the resin portion, and the polar teeth close to the gate portion are eliminated, so that a gap between the polar teeth at a region from which the polar teeth are eliminated is increased.

4. A stepping motor comprising:

coil subassemblies arranged in an axial direction of a cylindrical rotor and integrated with a resin portion, each one of said coil subassemblies having upper and lower stator cores and a coil formed therebetween, each one of the stator cores having comblike polar teeth in a central portion thereof, the polar teeth being alternately arranged and confronting a magnet of the cylindrical rotor, wherein a gate portion for charging a resin is disposed on a side surface of the resin portion, a lower stator core of one subassembly confronts an upper stator core of another subassembly, and only the polar teeth on said lower stator core and said upper stator core in the vicinity of said gate portion are removed.

* * * * *